US012670159B2

(12) United States Patent
    Trigonakis et al.

(10) Patent No.: US 12,670,159 B2
(45) Date of Patent: Jun. 30, 2026

(54) QUERY OPTIMIZATIONS FOR ASYNCHRONOUS DISTRIBUTED QUERIES ON GRAPHS WITH SCHEMA

(71) Applicant: Oracle International Corporation, Redwood Shores, CA (US)

(72) Inventors: Vasileios Trigonakis, Zurich (CH); Jinsu Lee, San Mateo, CA (US); Arnaud Delamare, Zurich (CH); Naufal Serraj, Casablanca (MA); Sungpack Hong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/000,404

(22) Filed: Dec. 23, 2024

(65) Prior Publication Data

US 2026/0178583 A1     Jun. 25, 2026

(51) Int. Cl.
    *G06F 16/00*         (2019.01)
    *G06F 16/21*         (2019.01)
    *G06F 16/2453*       (2019.01)

(52) U.S. Cl.
    CPC ...... *G06F 16/24542* (2019.01); *G06F 16/212* (2019.01)

(58) Field of Classification Search
    CPC ........................ G06F 16/24542; G06F 16/212
    USPC ................................................ 707/600–899
    See application file for complete search history.

(56) References Cited

U.S. PATENT DOCUMENTS

| | | | |
|---|---|---|---|
| 11,675,785 B2 | 6/2023 | Trigonakis et al. | |
| 2020/0409931 A1* | 12/2020 | Zang ................... | G06F 16/2365 |
| 2021/0194905 A1* | 6/2021 | Fong ................... | H04L 63/1425 |
| 2022/0129451 A1* | 4/2022 | Haprian ............... | G06F 16/252 |
| 2023/0045347 A1* | 2/2023 | Grady ................... | G06N 5/02 |
| 2023/0252077 A1* | 8/2023 | Kapp ................... | G06F 16/28 707/798 |
| 2023/0267120 A1* | 8/2023 | Kapp ................... | G06F 16/28 707/717 |
| 2023/0297619 A1* | 9/2023 | Vlant .................. | G06F 16/9024 707/689 |
| 2023/0409610 A1 | 12/2023 | Gratzer et al. | |
| 2024/0346022 A1* | 10/2024 | Kläbe ............... | G06F 16/24526 |

OTHER PUBLICATIONS

Trigonakis et al., "aDFS: An Almost Depth-First-Search Distributed Graph-Querying System", Usenix Annual Technical Conference 2021, 12 pages.
Roth et al., "PGX.D/Async: A Scalable Distributed Graph Pattern Matching Engine", GRADES'17, 6 pages, available: http://dx.doi.org/10.1145/3078447.3078454.
Neo4j Bloom, Search phrases for advanced queries, available: https://neo4j.com/docs/bloom-user-guide/current/bloom-tutorial/search-phrases-advanced/#parameter-data-types.

* cited by examiner

*Primary Examiner* — Michelle N Owyang
(74) *Attorney, Agent, or Firm* — Hickman Becker Bingham Ledesma LLP; Stephen R. Tkacs

(57)     ABSTRACT

Query optimization techniques are provided for graphs with schema that can significantly reduce remote communication (i.e., networking) for distributed graph queries, with a focus on distributed asynchronous traversals. The optimization techniques include (i) a set of rules to infer and add schema information to graph queries, thus enabling better query planning, and (ii) a set of rules for reducing redundant schema information from the query execution plan, thus making the execution more lightweight.

20 Claims, 4 Drawing Sheets

Machine 0                          Machine 1

FIG. 5

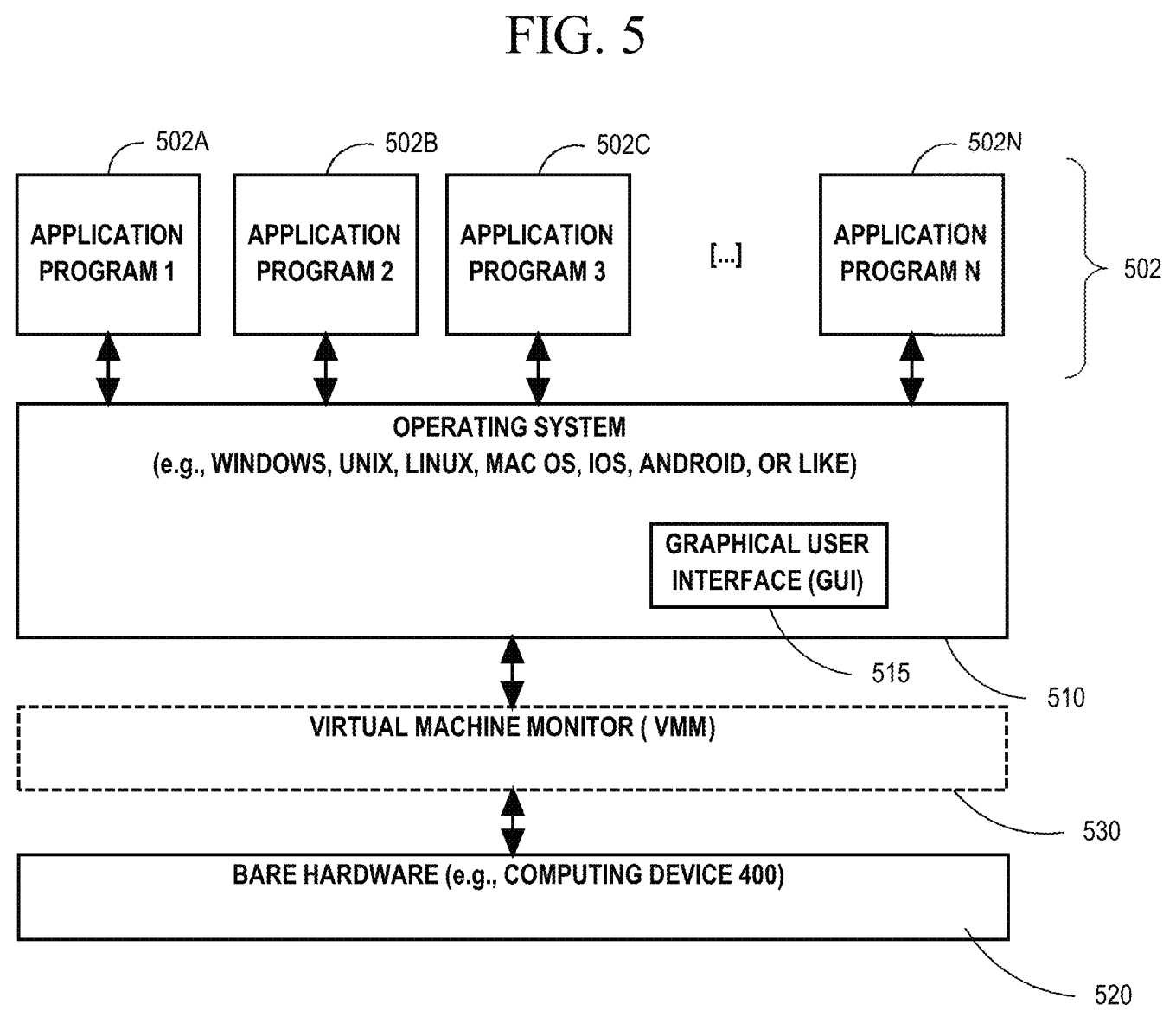

APPLICATION PROGRAM 1 — 502A

APPLICATION PROGRAM 2 — 502B

APPLICATION PROGRAM 3 — 502C

[...]

APPLICATION PROGRAM N — 502N

502

OPERATING SYSTEM
(e.g., WINDOWS, UNIX, LINUX, MAC OS, IOS, ANDROID, OR LIKE)

GRAPHICAL USER INTERFACE (GUI) — 515

510

VIRTUAL MACHINE MONITOR (VMM) — 530

BARE HARDWARE (e.g., COMPUTING DEVICE 400) — 520

QUERY OPTIMIZATIONS FOR ASYNCHRONOUS DISTRIBUTED QUERIES ON GRAPHS WITH SCHEMA

FIELD OF THE INVENTION

The present invention relates to query optimization techniques for graphs with schema and, more particularly, to query optimization techniques for distributed graph queries with a focus on distributed asynchronous traversals.

BACKGROUND

In graph processing, data is represented as a property graph, where entities are represented as vertices, and relationships are represented as edges. A graph can be annotated with labels and properties. Labels identify vertices and edges, and properties describe vertices and edges. A table that contains data entities is a vertex table. Each row in the vertex table is a vertex. The columns in the vertex table are properties of the vertex. The name of the vertex table is the default label for this set of vertices. An edge table can be any table that links two vertex tables, or a table that has data that indicates an action from a source entity to a target entity. Some of the properties of an edge table can be the properties of the edge. The name of an edge table is the default label for the set of edges. The vertex and edge properties of a graph are derived from the columns of the vertex and edge tables respectively and by default have the same name as the underlying table columns.

A database schema is a structure of a database described in a formal language supported typically by a relational database management system (RDBMS). The term "schema" refers to the organization of data as a representation of how the database is constructed. Similarly, a graph schema is a structure representing the organization of a graph, including, for example, vertex types, edge types, properties of each vertex type, properties of each edge type, and which edge types are used to connect which vertex types.

Property graphs offer powerful graph support to explore and discover complex relationships in data sets. Property Graph Query Language (PGQL) is a SQL-like query language for property graph data structures that consist of vertices that are connected to other vertices by edges, each of which can have key-value pairs (properties) associated with them. PGQL is based on the concept of graph pattern matching, which allows a query to specify patterns that are matched against vertices and edges in a data graph. Using a SQL/PGQ language extension, users can create property graphs and query those graphs with syntax very similar to PGQL. Such an extension is published in the SQL International Standard Organization (ISO).

Graph processing comprises two main styles of analysis, namely graph algorithms and graph pattern-matching queries. Classic graph algorithms, such as Pagerank, repeatedly traverse the vertices and edges of the graph and calculate some desired (mathematical) function. Graph queries enable the interactive exploration and pattern matching of graphs. Pattern matching is done by specifying one or more path patterns in the MATCH clause. A single path pattern matches a linear path of vertices and edges, while more complex patterns can be matched by combining multiple path patterns. Value expressions (similar to their SQL equivalents) are specified in the WHERE clause and allow filtering of matches, typically by specifying constraints on the properties of the vertices and edges. Both algorithms and queries are very challenging workloads, especially in a distributed setting, where very large graphs are partitioned across multiple machines.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the Drawings:

FIG. 5 is a block diagram of a basic software system that may be employed for controlling the operation of a computer system upon which aspects of the illustrative embodiments may be implemented.

DETAILED DESCRIPTION

Figure 1:
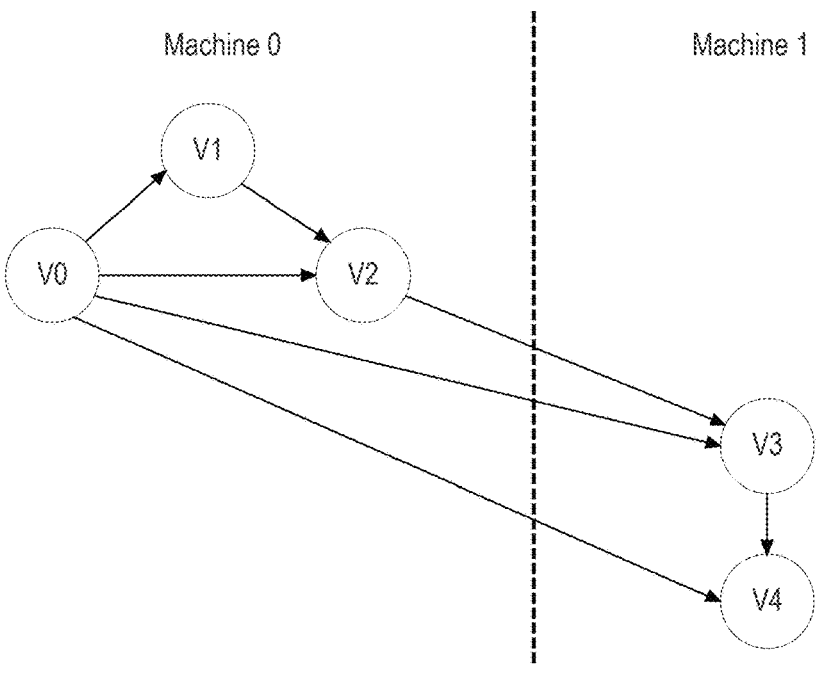
FIG. 1 is an example graph that is partitioned across two machines.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments introduce query optimization techniques for graphs with schema that can significantly reduce remote communication (i.e., networking) for distributed graph queries, with a focus on distributed asynchronous traversals. The optimization techniques include (i) a set of rules to infer and add schema information to graph queries, thus enabling better query planning, and (ii) a set of rules for reducing redundant schema information from the query execution plan, thus making the execution more lightweight.

In accordance the illustrative embodiments, a graph processing engine in a distributed graph processing system, performs query augmentation for a graph pattern matching query that specifies a graph pattern including at least one source vertex, at least one destination vertex, and at least one edge connecting a source vertex to a destination vertex. The graph processing engine performs the query augmentation by identifying schema information missing from the graph pattern matching query based on the graph schema and adding the identified schema information to the graph pattern matching query to form an augmented query. In some embodiments, the graph processing engine incrementally annotates the query with missing or hidden schema-related information. This inference and addition may be performed repeatedly until no further additional schema information can be inferred. In some embodiments, the query augmentation may further include incrementally reducing information that is not relevant during runtime. The augmented query can then be used for query execution planning.

In accordance with the illustrative embodiments, the set of rules for reducing redundant schema information include rules for neighbor match with edge and destination vertex labels, neighbor match with unique edge label, and inconsistent labels due to property accesses in filters. For neighbor match with edge and destination vertex labels, the graph processing engine removes the destination vertex label, which can be applied to both forward and reverse edges. For neighbor match with unique edge label, the graph processing engine removes the edge label, which can be applied to both forward and reverse edges. For inconsistent labels due to property accesses in filters, the graph processing engine uses the schema information to remove inconsistent labels with property accesses. This removal of labels may be performed repeatedly until no further removals are identified. In some embodiments, the query augmentation may further include incrementally reducing information that is not relevant during runtime. The resulting query and query plan can then be used for query execution.

The query augmentation techniques of the illustrative embodiments make use of graph schema to speed up queries by (i) reducing remote pattern matching communication and (ii) eliminating the need to evaluate filters and property access that are guaranteed to yield no results.

Distributed in-Memory Graph Processing

Distributed in-memory graph queries enable processing very large graphs. To avoid possible memory explosion and to guarantee the completion of distributed query processing on graph data, it is essential to control memory consumption during graph querying and pattern matching. A promising approach is through the use of asynchronous distributed traversals. These traversals not only ensure flow control to limit memory consumption but also facilitate high parallelism, thereby enhancing performance and scalability, as well as hiding communication latency.

Any distributed graph query engine, but especially graph query engines with asynchronous distributed traversals, must reduce the amount of data transfer across machines to improve performance because communication cost is much more expansive than computation cost. In distributed systems, graphs are typically partitioned across machines, with a set of vertices and the edges of those vertices residing in each machine. FIG. 1 is an example graph that is partitioned across two machines. When graph pattern matching, for example, matching the pattern (a)→(b), communication happens when a pattern follows a "remote" edge, i.e., an edge for which the destination vertex resides on another machine. For instance, if (a) has matched V2, then a message must be sent to match (b) with V3.

Ideally, any such remote communication of intermediate results should contribute to producing potential final results. For example, consider the following graph definition (used in all example queries herein):

Vertex Types:
    Person
    Address (containing property post_code)
    Book (containing property ISBN)

Edge Types:
    Likes—connecting Person to Person and Person to Book
    Owns—connecting Person to Book (and containing property bought_price)
    Lives_in—connecting Person to Address Now Consider the Following Query (Expressed in PGQL):
    SELECT*FROM MATCH (p:Person)-[e: Likes]→(b)
    WHERE b. ISBN="1-84356-028-3"

This query will deterministically produce vertices (b) of type Book only, as a Person vertex will have a NULL value for ISBN (equality with NULL gives false). If this and similar access patterns are not accounted for in the graph processing engine, superfluous data communication will happen, resulting in a waste of resources and reduced performance. These issues arise from the schema-free nature of graph query languages, which offer full expressivity but enable the users to write under-annotated queries.

Another Important Example is the Following Query:
    SELECT*FROM MATCH (p:Person)-[e]→(b:Book)

This query does not specify the label of edge [e], meaning that a distributed graph processing engine will follow all edges of person (p) to then reach (b), which could be hosted on a remote machine, only to match vertices (b) that are of type Book.

A breadth-first search (BFS) distributed graph engine matches all (p) vertices before matching the—[e]→(b) pattern. This could in principle allow for optimizations where all edges that lead to Book vertices and all edges that lead to Person vertices can be bulk sent. This still produces unnecessary communication, but this bulk-send could allow an engine to optimize performance of filtering out the non-matchable Person and Address vertices. However, in distributed asynchronous traversals, workers do not synchronize and might work on independent parts of the query, thus this unnecessary communication cannot be optimized during runtime.

Therefore, the illustrative embodiments provide query augmentation and optimization to reduce the amount of communication in graph pattern matching with a focus on distributed asynchronous traversals.

Query Optimization with Schema

Figure 2:
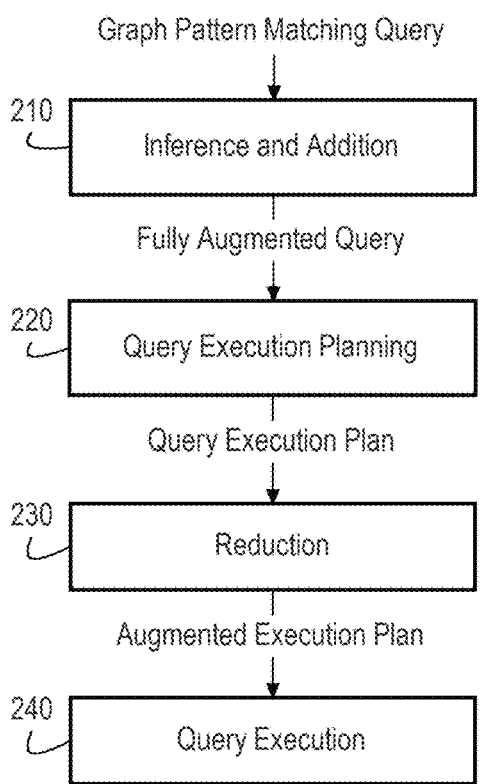
FIG. 2 is a block diagram illustrating query optimization with schema information to produce an augmented query for query execution planning in accordance with an embodiment.

The illustrative embodiments use simple but effective techniques to optimize a graph pattern matching query plan for distributed execution. FIG. 2 is a block diagram illustrating query optimization with schema information to produce an augmented query for query execution planning in accordance with an embodiment. The query optimization with schema information operations include two main steps:

1. Inference and Addition 210: Incrementally annotating the query with missing or hidden schema-related information; and,
    2. Reduction 230: Incrementally reducing information that is not relevant during runtime and, thus, is pure overhead due to schema- and engine-specific characteristics.

A graph processing engine receives a graph pattern matching query and performs inference and addition 210 to generate an augmented query. The graph processing engine infers missing or hidden schema-related information based on the schema of the graph being queried. In one embodiment, the graph processing engine performs the inference using a set of rules, as will be described in further detail below. In some embodiments, the graph schema is stored in a representation in one or more data structures, such as the graph definition shown above. The graph schema may include the following information: vertex types, edge types, properties of each vertex type, properties of each edge type, the source and/or destination vertex types that can be connected by each edge type, etc.

In some embodiments, the graph schema information may be inferred by sampling the underlying tables of the graph. For example, when loading the graph into memory, the graph processing system may determine that the source vertices of a particular edge type are always of a particular vertex type. The graph processing system can then build representation of the graph schema definition in one or more data structures.

As an Example of Inference and Addition, Consider the Following Query:

(p:Person)-[e]→(a) WHERE a.post_code=332211

Because Only an Address Vertex has a Post-Code Property, the Query Becomes the Following Augmented Query:

(p:Person-[e]→(a:Address)      WHERE      a.post_
code=332211

Because Only the Lives_in Type Edges Connect a Person Vertex to an Address Vertex, the Query Becomes the Following Augmented Query:

(p:Person)-[e: Lives_in]→(a:Address) WHERE a.post_
code=332211

Thus, in this example, the vertex type of Address for the vertex (a) and the edge type of Lives_in for the edge [e] are added to the query based on the graph schema.

As an example of reduction of schema information, the graph processing engine may determine that a Lives_in edge type can only connect a Person vertex to an Address vertex. The above query would then become the following augmented query:

(p:Person)-[e:      Lives_in]→(a)      WHERE      a.post_
code=332211

In this example, the vertex type for (a) is not relevant at runtime, because all edges of type Lives_in will connect to an Address vertex, and is removed from the augmented query.

In some embodiments, the inference and addition step 210 of the query optimization are performed repeatedly until no further additional schema information can be inferred. The fully augmented query is then used for execution planning 220, i.e., determining which execution order to follow in the execution plan. In the depicted embodiment, execution planning 220 uses the fully augmented query resulting from the inference and addition step 210, because it gives the query planner the best information to make good decisions when forming the query execution plan. For example, the pattern (p:Person)-[e: Lives_in]→(a) does not filter (a) with any type or property labels; therefore, the query planner could infer that (a) could be matching the entire graph if the execution plan decides to match (a) first and then match the (p:Person)←[e: Lives_in]-reverse edge.

Once the matching order has been fixed, the graph processing engine can repeatedly perform the reduction step 230 until there is nothing more to reduce. Then the graphs processing engine performs query execution 240 on the resulting query.

As an example, an input query counts the number of people living per post code, with the post code in the range of 1000 to 2000, such as the following query:

SELECT a.post_code, COUNT(p) FROM MATCH (p)-
[e]→(a) WHERE
a.post_code BETWEEN 1000 AND 2000 GROUP BY
a.post_code In a first step, the graph processing engine infers from the filter on a.post_code that (a) can only be an Address vertex and adds the Address label. The resulting query is as follows:

SELECT a.post_code, COUNT(p) FROM MATCH (p)-
[e]→(a:Address)
WHERE a.post_code BETWEEN 1000 AND 2000
GROUP BY a.post_code In a second step, the graph processing engine infers that an Address vertex is only connected through a Lives_in type edge and adds the Lives_in label. The resulting query is as follows:

SELECT a.post_code, COUNT(p) FROM MATCH (p)-
[e:Lives_in]-(a:Address)      WHERE      a.post_code
BETWEEN 1000 AND 2000 GROUP BY a.post_code In a third step, the graph processing engine infers that the source of a Lives_in edge can only be a Person vertex and adds the Person label. The resulting query is as follows:

SELECT a.post_code, COUNT(p) FROM MATCH
(p:Person)-[e:Lives_in]-(a:Address) WHERE a.post_
code BETWEEN 1000 AND 2000 GROUP BY a.pos-
t_code The graph processing engine then performs execution planning using the fully augmented query. With high probability, the execution planner will start from (a), because it is filtered. The resulting execution plan is as follows:

SELECT a.post_code, COUNT(p) FROM MATCH
(a:Address)←
[e:Lives_in]-(p:Person)      WHERE      a.post_code
BETWEEN 1000 AND 2000 GROUP BY a.post_code As an example of reduction, the graph processing engine determines that the source of a Lives_in edge can only be a Person vertex, thus there is no need to filter on the receiving side. The resulting query is as follows:

SELECT a.post_code, COUNT(p) FROM MATCH
(a:Address)←
[e:Lives_in]-(p) WHERE a.post_code BETWEEN 1000
AND 2000 GROUP BY a.post_code In a second step of reduction, the graph processing engine determines that only a Lives_in type edge can be the incoming edge of an Address vertex, thus there is no need to keep the Lives_in label. The resulting query/execution plan is as follows:

SELECT a.post_code, COUNT(p) FROM MATCH
(a:Address)←[e]-(p)
WHERE a.post_code BETWEEN 1000 AND 2000
GROUP BY a.post_code This execution plan includes
graph schema information to improve performance of
the query, particularly for distributed asynchronous
traversals, to reduce communication and also reduce
overhead for matching labels that are not relevant.

Optimization Patterns

The techniques of the illustrative embodiments can be incorporated on any graph query planner. For a distributed graph engine to be able to leverage the optimizations provided by these techniques, it must support schema-based traversals and pattern matching. For example, for a vertex scan with a label (e.g., (p:Person)), the optimization directly accesses only vertex tables with the vertex type of Person. The graph is split into tables per vertex type label. In the example of the above graph definition, Person and Address represent two separate vertex tables.

For a neighbor match with edge label (e.g., (src)-[: Lives_in]→(dst)), the optimization iterates only on edge tables with the label Lives_in. Similar to vertex tables, edge data are stored partitioned per edge type label. This allows for a traversal to physically iterate over the edges of a specific type. In the example graph definition, a Person vertex: Likes a Person vertex, Likes a Book vertex, Owns a Book vertex, or Lives_in an Address vertex. Without this optimization, traversing all neighbors of a Person vertex tries all three types (Likes, Owns, Lives_in) of edge labels and filters them at runtime, thus wasting work. With the optimization, the execution plan chooses to iterate the query edge labels; therefore, accessing only required data.

For a NULL property access in filters (e.g., (p:Person) WHERE NULL), the optimization determines NULL equals false in filters. This is the classic way of handling NULL values in filters.

The illustrative embodiments include further optimization patterns that can be applied to improve execution for distributed graph queries, particularly distributed asynchronous traversals. These optimization patterns can also work in conjunction with existing graph query auto-completion and error handling techniques. The inference and additions, as well as the removals, are performed using inferences based on a set of rules. These rules are based on optimization patterns, which are described below.

Inference and Additions

For source and destination, source only or destination only with labels, the optimization pattern requires that the connecting edge does not have an edge label. The graph processing engine uses the graph schema information to infer the edge label. If there are multiple matching edge labels, then the graph processing engine adds them all. Note that this optimization applies to forward, reverse, and undirected edges.

As an Example, Consider a Pattern with Both Source and Destination Labels, as Follows:

(src:Person-[e]→(dst:Address)

This Pattern Becomes the Following:

(src:Person)-[e:Lives_in]→(dist:Address)

As Another Example, Consider a Pattern with a Source Label Only, as Follows:

(src:Person)-[e]-(dst)

This Pattern Becomes the Following:

(src:Person)-[e:Lives_in | Owns | Likes]→(dst)

As Another Example, Consider a Pattern with a Destination Label Only, as Follows:

(src)-[e]→(dst:Address)

This Pattern Becomes the Following:

(src)-[e:Lives_in]→(dst:Address)

For an edge with labels, the optimization pattern requires that the source, destination, or both connected vertices do not have labels. The graph processing engine uses the graph schema information to infer the missing vertex labels. If there are multiple matching labels, the graph processing engine adds them all. If the label can be used to match different pairs of providers, the pattern match is split to cover each pair independently. Note that the optimization applies to forward, reverse, and undirected edges.

As an Example, Consider a Pattern with Both Source and Destination Labels Missing, as Follows:

(src)-[e:Lives_in]→(dst)

This Pattern Becomes the Following:

(src:Person)-[e:Lives_in]→(dst:Address)

As Another Example, Consider a Pattern with the Source Label Missing, as Follows:

(src)-[e:Lives_in]→(dst:Address)

This Pattern Becomes the Following:

(src:Person)-[e:Lives_in]→(dst:Address)

As Another Example, Consider a Pattern with the Destination Label Missing, as Follows:

(src:Person)-[e: Likes]→(dst)

This Pattern Becomes the Following:

(src:Person)-[e: Likes]→(dst:Person | Book)

For unique property types to labels, the optimization pattern requires that the vertex or edge property exists for a subset of the vertex/edge labels. The graph processing engine uses the graph schema information to infer missing labels. If there are multiple matching labels, the graph processing engine adds them all.

As an Example, Consider the Following Vertex:

(vertex) WHERE vertex.post_code=1000

Because Post_Code is Unique to Address Vertices, this Vertex Becomes the Following:

(vertex:Address) WHERE vertex.post_code=1000

As Another Example, Consider the Following Edge:

(src)-[edge]→(dst) WHERE edge.bought_price=10

Because Bought_Price is Unique to Owns Edges, the Edge Becomes the Following:

(src)-[edge:Owns]→(dst)     WHERE     edge.bought_
price=10

For deterministic NULL property access due to labels, the optimization pattern requires that the vertex or edge property exists for a subset of the vertex/edge labels. The graph processing engine uses the graph schema information to replace property accesses with NULL values when a property access happens for a label that does not include that property. Note that when a property access happens in filters, the optimization applies if and only if none of the labels of the vertex/edge accesses contains that property. Otherwise, a partial optimization for removing inconsistent labels due to property accesses, as described below, can be applied.

As an Example, Consider the Following Projection:

SELECT vertex.post_code WHERE (vertex: Person)

Because Post_Code is Unique to Address Vertices, the Projection Becomes the Following:

SELECT NULL WHERE (vertex: Person)

As Another Example, Consider the Following Filter:

SELECT . . . WHERE (vertex: Person) WHERE vertex.
post_code=1000

Because Post Code is Unique to Address Vertices, the Filter Becomes the Following:

SELECT . . . WHERE (vertex: Person) WHERE NULL

As Another Example, Consider the Following Post-Processing:

SELECT WHERE (vertex: Person)-[edge: Likes]→(dst) GROUP BY edge.post_code

Because Post_Code is Unique to Address Vertices, the Post-Processing Becomes the Following:

SELECT . . . WHERE (vertex: Person)-[edge: Likes]→
(dst) GROUP BY NULL

Removals

For neighbor match with edge and destination vertex labels, the optimization pattern requires that the connecting edge uniquely connects the source to the destination labels. The graph processing engine removes the destination label. Note that the optimization applies to both forward and reverse edges.

As an Example Forward Edge, Considering the Following Forward Edge:

(src:Person)-[e:Lives_in]→(dst:Address)

The Forward Edge Becomes the Following:

(src:Person)-[e:Lives_in]→(dst)

As Another Example, Consider the Following Reverse Edge:

(src: Address)←[e:Lives_in]-(dst:Person)

The Reverse Edge Becomes the Following:

(src: Address)←[e:Lives_in]-(dst)

For a neighbor match with a unique edge label, the optimization pattern requires that the connecting edge can only be of this specific label, because the attached vertex has a label that connects with that single edge label type. The graph processing engine removes the edge label. Note that the optimization applies to both forward and reverse edges. As an Example, Consider the Following Pattern:

(src: Address)←[e:Lives_in]-(dst)

This Pattern Becomes the Following:

(src: Address)←[e]-(dst)

For inconsistent labels due to property accesses in filters, the optimization pattern requires that the vertex or edge property exists for a subset of the vertex/edge labels. The graph processing engine uses the graph schema information to remove inconsistent labels with property accesses. If the vertex/edge ends up with no labels, the graph processing engine infers deterministic NULL property accesses due to labels, as described above. As an Example, Consider the Following Vertex:

(vertex: Person | Address) WHERE vertex.post_code=1000

Because the Post_Code Property is Unique to Address Vertices, this Vertex Becomes the Following:

(vertex:Address)

As Another Example, Consider the Following Edge:

(src)-[edge: Likes | Owns]→(dst) WHERE edge.bought_price=10 Because the bought_price property is unique to Owns edges, the edge becomes the following:

(src)-[edge:Owns]→(dst) WHERE edge.bought_price=10

Procedural Overview

Figure 3:
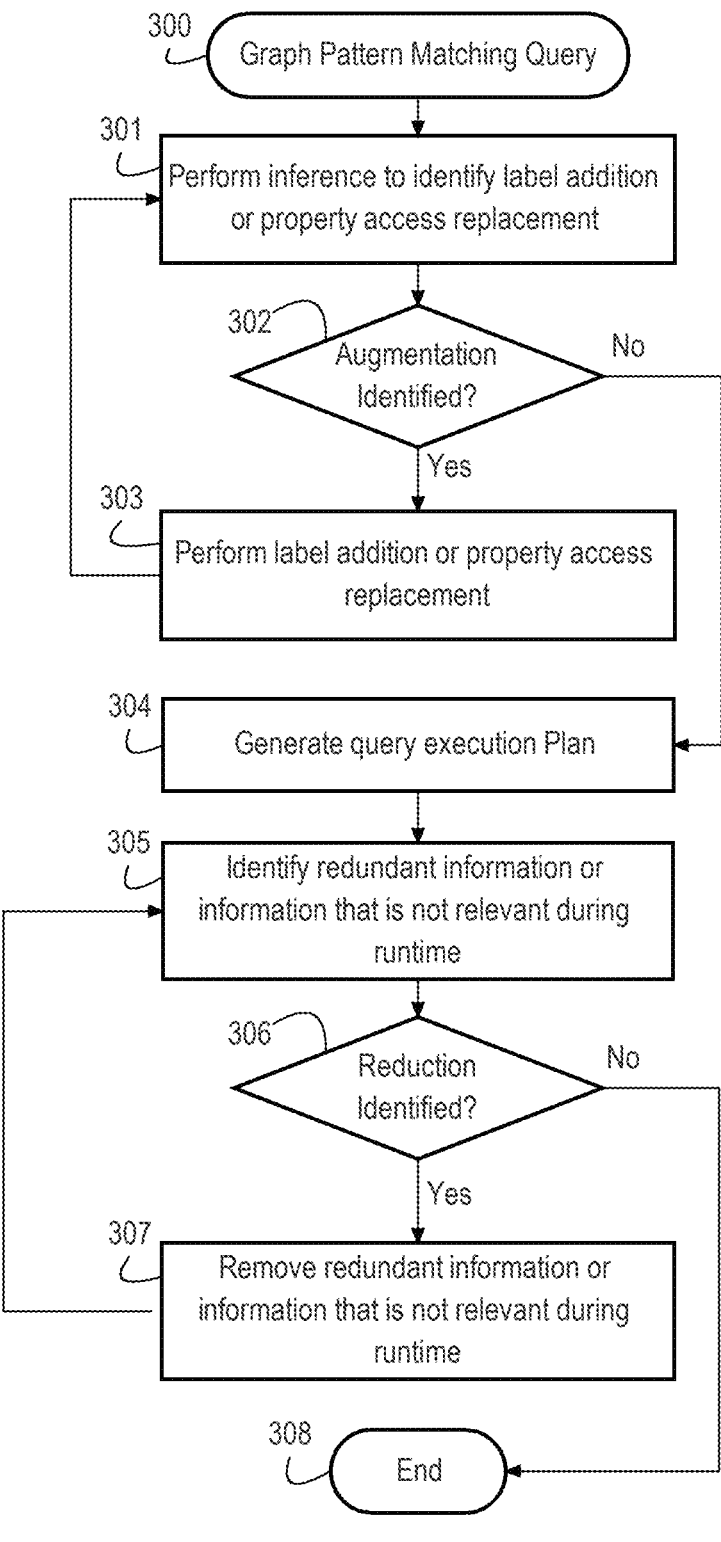
FIG. 3 is a flowchart illustrating operation of a graph processing engine performing query optimization with graph schema information in accordance with an embodiment.

FIG. 3 is a flowchart illustrating operation of a graph processing engine performing query optimization with graph schema information in accordance with an embodiment. Operation begins with a graph pattern matching query (block 300). The graph processing engine performs an inference to identify label addition or property access placement (block 301). In one embodiment, the inference may be performed using a set of rules. The graph processing engine then determines whether an augmentation is identified (block 302). If an augmentation is identified (block 302: Yes), then the graph processing engine performs label addition or property access replacement to augment the query with graph schema information (block 303). Thereafter, operation returns to block 301 to perform an inference to identify label addition or property access replacement.

If an augmentation is not identified (block 302: No), then the graph processing engine generates a query execution plan based on the fully augmented query (block 304). The graph processing engine then identifies redundant information or information that is not relevant during runtime (block 305). The graph processing engine determines whether a reduction is identified (block 306). If a reduction is identified (block 306: Yes), then the graph processing engine removes the redundant information or information that is not relevant during runtime (block 307).

If a reduction is not identified (block 306: No), then operation ends (block 308). This results in an execution plan that includes graph schema information to improve performance of execution of the query, particularly for distributed asynchronous traversals, to reduce communication and also reduce overhead for matching labels that are not relevant.

DBMS Overview

A database management system (DBMS) manages a database. A DBMS may comprise one or more database servers. A database comprises database data and a database dictionary that is stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

A database command may also be in the form of an API call. The call may include arguments that each specifies a respective parameter of the database command. The parameter may specify an operation, condition, and target that may be specified in a database statement. A parameter may specify, for example, a column, field, or attribute to project, group, aggregate, or define in a database object.

In a DOCS, a database command may be in the form of functions or object method calls that invoke CRUD (Create Read Update Delete) operations. Create, update, and delete operations are analogous to insert, update, and delete operations in DBMSs that support SQL. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

When operations are referred to herein as being performed at commit time or as being commit time operations, the operations are performed in response to a request to commit a database transaction. DML commands may be auto-committed, that is, are committed in a database session without receiving another command that explicitly requests to begin and/or commit a database transaction. For DML commands that are auto-committed, the request to execute the DML command is also a request to commit the changes made for the DML command.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, a branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains definition metadata that defines properties of the database object. For example, definition metadata in a database dictionary defining a database table may specify the attribute names and data types of the attributes, and one or more files or portions thereof that store data for the table. Definition metadata in the database dictionary defining a procedure may specify a name of the procedure, the procedure's arguments, and the return data type, and the data types of the arguments and may include source code and a compiled version thereof.

A database dictionary is referred to by a DBMS to determine how to execute database commands submitted to a DBMS. Database commands can access or execute the database objects that are defined by the dictionary. Such database objects may be referred to herein as first-class citizens of the database. A first-class citizen is associated with a database object name, which can be referenced in database commands to identify the first-class citizen to DBMS. The database object name is mapped or otherwise associated with the database object. The DBMS refers to the definition metadata of the first-class citizen to determine how to access or execute the first-class citizen.

A database object may be defined by the database dictionary, but the definition metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., java file) and the compiled version of the class (i.e., class file).

Native data types are data types supported by a DBMS "out-of-the-box." Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data type and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
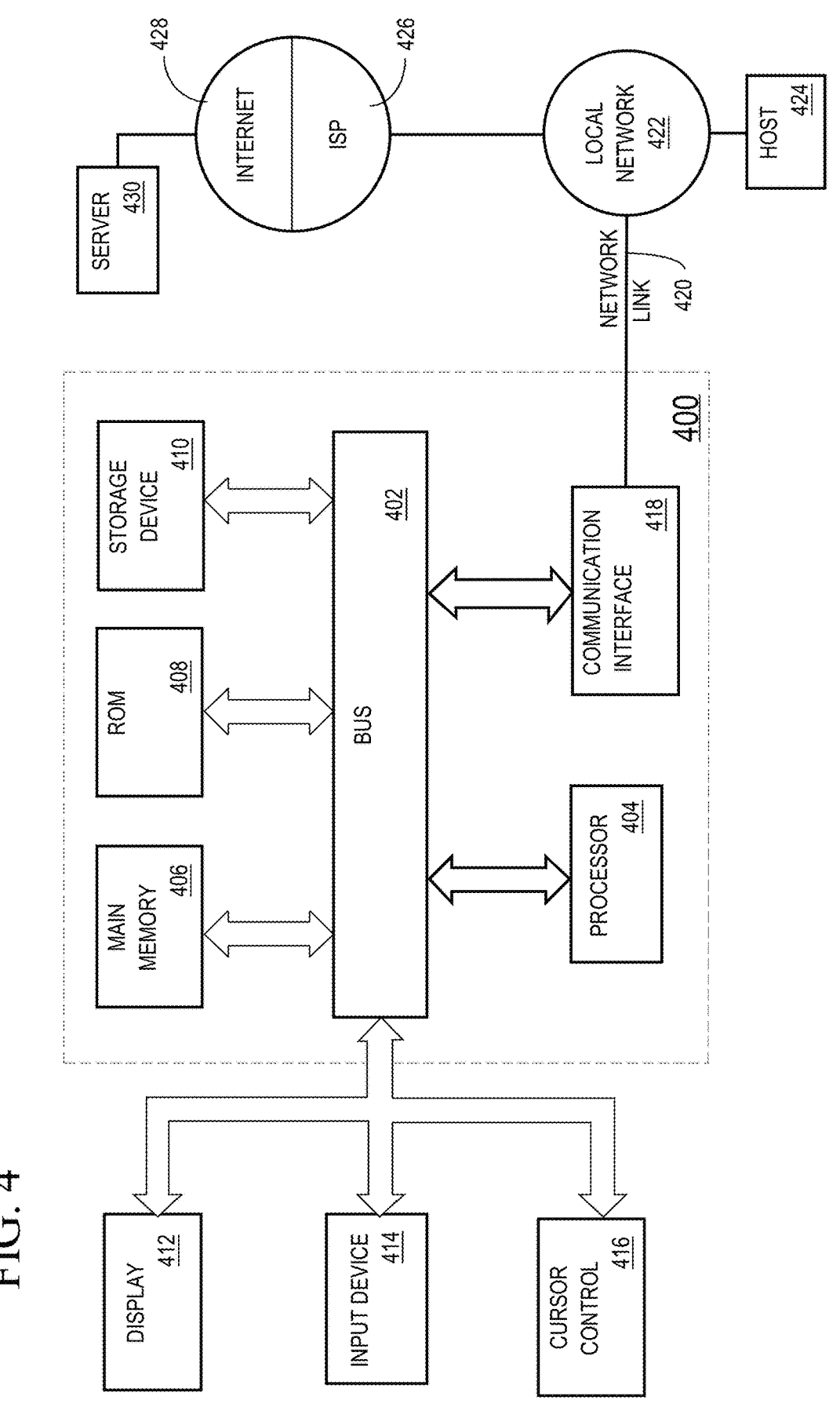
FIG. 4 is a block diagram that illustrates a computer system upon which the illustrative embodiments may be implemented.

For example, FIG. 4 is a block diagram that illustrates a computer system 400 upon which the illustrative embodiments may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

FIG. 5 is a block diagram of a basic software system 500 that may be employed for controlling the operation of computer system 400 upon which aspects of the illustrative embodiments may be implemented. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

performing query augmentation for a graph pattern matching query to be executed against a graph, wherein:

the graph has a graph schema defining: vertex types, vertex properties, edge types, and edge properties, the graph pattern matching query includes a graph pattern including at least one source vertex, at least one destination vertex, and at least one edge connecting a source vertex to a destination vertex, performing the query augmentation comprises:

inferring, from the graph pattern matching query, schema information based on the graph schema;

identifying one or more vertex or edge types, from the schema information, missing from the graph pattern; and adding one or more vertex or edge type labels corresponding to the one or more vertex or edge types to the graph pattern in the graph pattern matching query to form an augmented query; and performing query execution planning based on the augmented query, wherein the method is performed by one or more computing devices.

2. The method of claim 1, wherein identifying the one or more vertex or edge types missing from the graph pattern comprises:

determining that at least one of a particular source vertex or a particular destination vertex in the graph pattern has a particular vertex type label;

determining that a connecting edge connecting the particular source vertex to the particular destination vertex does not have an edge type label;

inferring at least one edge type label based on the graph schema and the particular vertex type label; and adding the at least one edge type label to the connecting edge in the graph pattern.

3. The method of claim 1, wherein identifying the one or more vertex or edge types missing from the graph pattern comprises:

determining that a particular edge in the graph pattern has a particular edge type label, wherein the particular edge connects a particular source vertex to a particular destination vertex;

determining that at least one of the particular source vertex or the particular destination vertex does not have a vertex type label;

inferring at least one vertex type label based on the edge type label and the graph schema; and adding the at least one vertex type label to the particular source vertex or the particular destination vertex in the graph pattern.

4. The method of claim 1, wherein identifying the one or more vertex or edge types missing from the graph pattern comprises:

determining that the graph pattern specifies a vertex or edge property for a particular vertex or a particular edge, wherein the vertex or edge property exists for a subset of vertex types or edge types in the graph schema;

inferring at least one vertex or edge type corresponding to the specified vertex or edge property based on the graph schema; and adding at least one vertex or edge type label corresponding to the at least one vertex or edge type to the particular vertex or the particular edge in the graph pattern.

5. The method of claim 1, wherein performing the query augmentation comprises:

determining that the graph pattern matching query includes a property access for a vertex or edge type that does not include the property based on the graph schema; and replacing the property access with a NULL value in the graph pattern matching query.

6. The method of claim 1, wherein performing the query augmentation comprises repeating query augmentation until no further missing schema information is identified.

7. The method of claim 1, further comprising:

performing schema information removal to remove redundant schema information or schema information that is not relevant during runtime.

8. The method of claim 7, wherein performing the schema information removal comprises:

determining that the graph pattern specifies a connecting edge with an edge type that uniquely connects to a particular destination vertex type based on the graph schema;

determining that a particular destination vertex of the connecting edge has a particular vertex type label of the particular destination vertex type; and removing the particular vertex type label from the particular destination vertex in the graph pattern.

9. The method of claim 7, wherein performing the schema information removal comprises:

determining that the graph pattern specifies a connecting edge for which only a particular edge type is possible based on the graph schema;

determining that the connecting edge has a particular edge type label of the particular edge type; and removing the particular edge type label from the connecting edge in the graph pattern.

10. The method of claim 7, wherein performing the schema information removal comprises removing inconsistent labels with property accesses.

11. One or more non-transitory storage media storing instructions which, when executed by one or more computing devices, cause:

performing query augmentation for a graph pattern matching query to be executed against a graph, wherein:

the graph has a graph schema defining: vertex types, vertex properties, edge types, and edge properties, the graph pattern matching query includes a graph pattern including at least one source vertex, at least one destination vertex, and at least one edge connecting a source vertex to a destination vertex, performing the query augmentation comprises:

inferring, from the graph pattern matching query, schema information based on the graph schema;

identifying one or more vertex or edge types, from the schema information, missing from the graph pattern; and adding one or more vertex or edge type labels corresponding to the one or more vertex or edge types to the graph pattern in the graph pattern matching query to form an augmented query; and performing query execution planning based on the augmented query.

12. The one or more non-transitory storage media of claim 11, wherein identifying the one or more vertex or edge types missing from the graph pattern comprises:

determining that at least one of a particular source vertex or a particular destination vertex in the graph pattern has a particular vertex type label;

determining that a connecting edge connecting the particular source vertex to the particular destination vertex does not have an edge type label;

inferring at least one edge type label based on the graph schema and the particular vertex type label; and adding the at least one edge type label to the connecting edge in the graph pattern.

13. The one or more non-transitory storage media of claim 11, wherein identifying the one or more vertex or edge types missing from the graph pattern comprises:

determining that a particular edge in the graph pattern has a particular edge type label, wherein the particular edge connects a particular source vertex to a particular destination vertex;

determining that at least one of the particular source vertex or the particular destination vertex does not have a vertex type label;

inferring at least one vertex type label based on the edge type label and the graph schema; and adding the at least one vertex type label to the particular source vertex or the particular destination vertex in the graph pattern.

14. The one or more non-transitory storage media of claim 11, wherein identifying the one or more vertex or edge types missing from the graph pattern comprises:

determining that the graph pattern specifies a vertex or edge property for a particular vertex or a particular edge, wherein the vertex or edge property exists for a subset of vertex types or edge types in the graph schema;

inferring at least one vertex or edge type corresponding to the specified vertex or edge property based on the graph schema; and adding at least one vertex or edge type label corresponding to the at least one vertex or edge type to the particular vertex or the particular edge in the graph pattern.

15. The one or more non-transitory storage media of claim 11, wherein performing the query augmentation comprises:

determining that the graph pattern matching query includes a property access for a vertex or edge type that does not include the property based on the graph schema; and replacing the property access with a NULL value in the graph pattern matching query.

16. The one or more non-transitory storage media of claim 11, wherein performing the query augmentation comprises repeating query augmentation until no further missing schema information is identified.

17. The one or more non-transitory storage media of claim 11, further comprising:

performing schema information removal to remove redundant schema information or schema information that is not relevant during runtime.

18. The one or more non-transitory storage media of claim 17, wherein performing the schema information removal comprises:

determining that the graph pattern specifies a connecting edge with an edge type that uniquely connects to a particular destination vertex type based on the graph schema;

determining that a particular destination vertex of the connecting edge has a particular vertex type label of the particular destination vertex type; and removing the particular destination vertex type label from the particular destination vertex in the graph pattern.

19. The one or more non-transitory storage media of claim 17, wherein performing the schema information removal comprises:

determining that the graph pattern specifies a connecting edge for which only a particular edge type is possible based on the graph schema;

determining that the connecting edge has a particular edge type label of the particular edge type; and removing the particular edge type label from the connecting edge in the graph pattern.

20. The one or more non-transitory storage media of claim 17, wherein performing the schema information removal comprises removing inconsistent labels with property accesses.

\* \* \* \* \*